3,573,275
ISOLATION AND PURIFICATION OF
COUMERMYCIN ANTIBIOTICS
Hubert Maehr, Belleville, James Parnell Scannell, Bloomfield, and Vernon Zeitz, Passaic, N.J., assignors to Hoffmann-La Roche Inc., Nutley, N.J.
No Drawing. Continuation-in-part of application Ser. No. 712,370, Mar. 12, 1968. This application Feb. 20, 1969, Ser. No. 801,168
Int. Cl. C07c 47/18
U.S. Cl. 260—210       10 Claims

ABSTRACT OF THE DISCLOSURE

A crude antibiotic complex known as the "coumermycin complex" is extracted from the fermentation broth or cells with a water miscible organic solvent in a basic or slightly acidic medium. Thereafter, the crude complex is isolated by acidification and filtration.

RELATED CASES

This application is a continuation-in-part of application Ser. No. 712,370, filed Mar. 12, 1968, and now abandoned in the names of Hubert Maehr, James Parnell Scannell and Vernon Zeitz. The benefit of the filing date of this earlier-filed pending application is hereby claimed.

BACKGROUND OF THE INVENTION

The antibiotic coumermycin (previously called sugordomycin), is produced by culturing *Streptomyces hazeliensis* var. *hazeliensis* nov, sp., an organism isolated from a sample of soil obtained in Matane, Gaspe, Canada. A culture of the organism has been deposited in the collection of microorganisms of the United States Department of Agriculture, Northern Utilization Research and Development Division, Peoria, Ill., under Registration No. NRRL 2938.

The processes for producing the antibiotic, as described in detail in Belgian Pat. No. 665,237, Dec. 10, 1965, results in a fermentation broth which contains a crude complex of antibiotic compounds. At least five active components can be isolated from this complex. Of the active components, that denoted "coumermycin $A_1$" is of most interest. In order to most efficiently produce coumermycin $A_1$ from the crude complex, it is desirable to separate the complex from the fermentation broth and cells in as high a yield as possible and in as pure a form as possible.

Various methods have been used, prior to this invention, attempting to separate the crude complex from the cells and fermentation broth.

In one method the fermentation broth is filtered at pH 8.0, the filtrate is adjusted to pH 6.0 and extracted with methyl isobutyl ketone. The mycelial cake is extracted with acetone, and the extract is evaporated to remove the solvent. The resulting aqueous concentrate is extracted with methyl isobutyl ketone at pH 6.0. The extracts are combined and washed with water. The washed extract containing the antibiotic complex is transferred into water at pH 10.0, re-extracted into ethyl acetate at pH 6.0, concentrated and precipitated with petroleum ether.

In another method, the crude complex is extracted from the whole broth at pH 6.0 with a water immiscible solvent, back extracted at pH 10.0 into water and re-extracted at pH 6.0 into ethyl acetate or methyl isobutyl ketone. The extract is concentrated and precipitated with petroleum ether.

In still another method, the crude complex is isolated by extraction of the mycelial cake twice with acetone-dioxane after adjusting the pH of the broth to 5.0 and filtering. The extracts are concentrated, then extracted with ethyl acetate or methyl isobutyl ketone at pH 6.0. The complex is then re-extracted into water at pH 9.0, back extracted into ethyl acetate at pH 6.0, concentrated and precipitated.

In a fourth method, the crude complex is extracted with 1-butanol from the cells which are previously obtained by filtration of the whole broth at pH 4.0–4.5. The pH of the extract is adjusted to 6–7 with caustic and the monosodium salts of the complex are precipitated from the concentrated solution with petroleum ether.

In another process, the whole broth is extracted with a water-immiscible solvent at pH 1–7 and the complex is recovered from the organic phase by adsorption onto ion-exchange resins, followed by elution with methanol.

BRIEF SUMMARY OF THE INVENTION

This invention concerns a process in which an antibiotic complex is separated from the fermentation broth, or from cells previously removed from the fermentation broth, with a water miscible organic solvent and water, preferably at a slightly alkaline pH.

DETAILED DESCRIPTION OF THE INVENTION

A crude antibiotic complex can be produced by culturing *Streptomyces hazeliensis* var. *hazeliensis* nov. sp. in a nutrient medium containing organic carbon and nitrogen sources, preferably, split peas (which is both a carbon and a nitrogen source) and from about 0.05 percent to about 3 percent $CaCO_3$, from about 0.1 percent to about 3 percent of a carbohydrate, e.g., a starch or sugar and from about 0.1 percent to about 0.5 percent $K_2HPO_4$. The culturing is carried out for from about 3 to about 8 days at an aeration rate of from about 0.5 to about 10 c.f.m. per 50 gallons of medium at a temperature of from about 20° C. to about 35° C.

Most of the resulting crude coumermycin complex so prepared is entrained in the mycelium or cells. A minor amount of the complex does diffuse out of the cells as a result of the conditions of fermentation. The complex is extracted from the cells in accordance with the process of the present invention either before or after the removal of the cells from the fermentation broth. It is however preferred to separate the cells from the fermentation broth prior to extracting the complex therefrom.

The separation of the cells from the fermentation broth is accomplished by first adjusting the pH of the fermentation broth to from about 2 to about 5, preferably to about 4.0 and then separating the cells by filtration. Maintaining the pH in this range during the cell separating step serves a dual purposes. First, it avoids diffusion of the crude complex from the cells and secondly it causes that portion of the complex which has diffused from the cells during the fermentation procedure to precipitate and hence, to deposit itself upon the surface of the cells. Thus, substantially all of the complex formed during the fermentation procedure is removed during the cell-separating step. The separation of the cells from the fermentation broth prior to the separation of the crude complex from the cells is not essential to a successful performance of the process of this invention. However, in order to obtain the best yields, this step is preferred.

After their separation from the fermentation medium, the cells are treated with an aqueous solution of a water miscible organic solvent at from about a very nearly neutral pH to about a slightly basic pH whereby the complex is extracted from the cells. The water in the aqueous solution insures a more selective extraction of the complex from impurities in the broth or associated with the cells and, hence, simplifies subsequent procedures designed to segregate the various members of the complex.

The complex can also be separated from the cells after their removal from the fermentation broth at a slightly acid pH of from about pH 6 to about pH 7, provided that there is sufficient water miscible solvent, for example, tetrahydrofuran or acetone present in the solvent medium to dissolve the complex therein. However, effecting the extraction of the complex at a basic pH is preferred.

In a less preferred embodiment, the complex is extracted from the cells prior to their separation from the fermentation broth. Then after filtration to remove the cells, the complex is present in the filtrate. This approach is less preferred because when the complex is separated from the broth, it may have associated with it difficulty removable broth impurities. Thus, the separation of the complex in substantially pure form is rendered more difficult.

In a preferred manner of performing this embodiment, the pH of the fermentation broth is adjusted to the alkaline side, e.g. from pH 7.0 to 9.0, preferably pH 7.3 to 7.8 and a water miscible solvent of the type described herein, e.g. acetone, is added. The water miscible solvent added forms with the water present in the fermentation beer, an aqueous extraction system. The cells are thereafter removed by filtration. The complex is then precipitated from the filtrate upon adjusting the pH of the filtrate to from about 2 to about 5, either before or after removal of the water miscible solvent by evaporation as described more fully hereinafter.

From the above it can be seen that when extracting the complex from the cells either before or after separation of the latter from the fermentation broth, the pH of the medium should be in the range of from about pH 6 to about pH 9.0, most preferably from about pH 7.3 to about pH 7.8. The adjustment of the pH is effected with any suitable organic or inorganic base, preferably, an inorganic base such as an alkali metal hydroxide (e.g. sodium hydroxide) or ammonium hydroxide and the like. However, any other base such as lower alkyl tertiary amines, for example, triethyl amine and the like can also be utilized in a less preferred embodiment as long as it is suitable for the purposes of the present invention, i.e. forms a salt which is soluble in water or a mixture of water and a water miscible solvent of the type described herein.

The organic solvents which can be utilized to extract the complex are those which are essentially miscible with water. Representative of these are polar solvents such as water miscible lower alkanols, e.g. methanol, ethanol, normal or isopropanol, tertiary butyl alcohol and the like, simple ketones such as acetone, water miscible ethers such as tetrahydrofuran, dioxane and the like, glycols such as ethyleneglycol dimethyl ether, propyleneglycol dimethyl ether and the like, dimethylsulfoxide, dimethylformamide, dimethylacetamide and other water miscible solvents. Usable for the purposes of the present invention are mixtures of these solvents with each other. Preferred are the alkanols specified above, particularly methanol and ethanol, acetone and tetrahydrofuran.

The amount of water present in the extracting solvent system can vary from about 25–75 parts by volume per 100 parts of the solvent system depending upon the pH at which the reaction is effected. For example, if methanol or ethanol are utilized as the water miscible organic solvent, then by volume from about 25 parts to about 50 parts of water and from about 75 parts to about 50 parts, most preferentially about 70 parts of methanol or ethanol are most suitable. It has been observed that the greater the polarity of the water miscible solvent, the higher its ratio in the aqueous extraction solvent system should be.

It is of course to be understood that the process is capable of achieving the desired end at other than the stated ratio of water to organic solvent in the solvent system. The amount of water present affects the results obtained during the complex extraction procedure. Thus, if sufficient water is not utilized when conducting the extraction procedure at an alkaline pH, the antibiotic complex is not completely extracted from the cells or undesirable components are coextracted. It should be evident that while the water needed varies, the amount thereof necessary for a successful performance of the process herein disclosed can be readily ascertained by one skilled in the art. By the use of the solvent system of the present invention and the effective selective separation of the coumermycin crude which results from its use, there can be removed about 90 percent or more of the activity from the cells.

In the process aspect which is less preferred, i.e. the aspect wherein the complex is separated from the cells before the cells are separated from the broth, it is preferred to use a solvent selected from the group consisting of tertiary butyl alcohol, acetone, tetrahydrofuran or dioxane and mixtures thereof.

After separating the antibiotic complex from the cells in the manner described above, the resultant media is acidified to a pH of from about 2 to about 5 (preferably from about 3.5 to about 4.1), preferably with a dilute mineral acid. The organic solvent present may be partially removed before or after the pH adjustment by evaporation under reduced pressure. The pH adjustment to the acid side renders the complex insoluble in the extraction medium and it precipitates out. The complex losses its affinity for water when the medium which contains it has a pH in the range of 2 to about 5. Thus, by reducing the ratio of the water miscible solvent present by evaporation or by adding additional water, good yields of the extracted crude in pure form can be obtained.

As is evident from the above either the depiction of the cells at an acid pH or the isolation of the complex at an acid pH can be accomplished with a dilute mineral acid such as a hydrohalic acid, e.g. HCl or HBr, sulfuric acid, polyphosphoric acid and the like.

The major component of the crude complex is coumermycin $A_1$. Its separation from the various other members of the crude complex can be effected by prior art techniques such as the use of liquid-liquid multi-stage extraction columns.

The following examples are illustrative but not limitative of the present invention. All temperatures are stated in degrees centigrade.

EXAMPLE 1

One gallon of a coumermycin fermentation broth is adjusted to pH 7.5–7.8 with $NH_4OH$ and 0.5 gallon of acetone is added without prior removal of the cells. The mixture is stirred at room temperature for 1 hour and filtered. The filtrate contains the crude complex in solution and has 90 percent of the activity of the whole broth. The complex is precipitated by evaporating most of the acetone from the filtrate and adjusting the pH of the filtrate to 4.0 with 6 M hydrochloric acid. A diatomaceous earth filter aid (Celite 535) is added and the mixture is filtered, the filter cake washed with methanol and the antibiotic eluted from the filter cake with tetrahydrofuran. The residue resulting after evaporation of the solvent is a complex from which coumermycin $A_1$ can be isolated.

EXAMPLE 2

500 g. of a filter cake containing filter aid and cells previously isolated from a coumermycin broth are suspended with stirring for one hour in a solvent composed of 750 ml. MeOH and 750 ml. $H_2O$, at pH 7.9 (adjusted and maintained with concentrated $NH_4OH$). The suspension is then filtered. The filtrate is acidified to pH 3.9 with 6 M hydrochloric acid, yielding a precipitate of the crude complex and then itself is filtered. A diatomaceous earth filter aid (Celite 535) is used to facilitate the last-mentioned filtration. The resulting filter cake which is washed twice by re-suspension in absolute methanol contains the coumermycin complex with 85 to 95 percent of the antibiotic activity of the fermentation broth and from which coumermycin A$_1$ can be isolated.

EXAMPLE 3

14,000 liters of a coumermycin fermentation broth is adjusted to pH 4 with dilute sulfuric acid, mixed with a diatomaceous earth filter aid and filtered. The resulting cake is mixed with 1300 liters of methanol and 550 liters of water. The mixture is homogenized and the pH is adjusted to 7.8 with ammonium hydroxide or dilute alkali. The suspension is stirred for about 3 hours and filtered. The filter cake is washed with a mixture of 100 liters of methanol and 300 liters of water. The combined filtrate and washings contain the complex with essentially all the antibiotic activity from the fermentation broth.

EXAMPLE 4

The cells obtained by precipitation from 4 liters of acidified fermentation broth are treated with a mixture of 0.5 liter of acetone and 1.0 liter of water at pH 7.7, filtered then washed with aqueous acetone. The resulting filtrate and washings contain the complex with about 90% of the antibiotic activity of the broth.

EXAMPLE 5

A coumermycin fermentation broth of about 3700 gallons is adjusted to pH 4 with 18 N H$_2$SO$_4$, mixed with a diatomaceous earth filter aid (Celite 535) and filtered. The resulting cell cake is then mixed with 1300 l. of methanol and 550 l. of water. The mixture is homogenized and the pH is adjusted to 7.8 with NH$_4$OH. The suspension is stirred for about 3 hours and filtered, the cake being washed with a mixture of 100 liters methanol and 300 liters water. The combined filtrate and washings are mixed with a diatomaceous earth filter aid, stirred vigorously and acidified to pH 3.9 with 5 N sulfuric acid. The precipitate which forms is allowed to settle. The supernatant is decanted and the remaining suspension is filtered by centrifugation. The resulting cake is washed with 25 liters of methanol and spun dry. The filter cake contains the crude antibiotic complex and diatomaceous earth. One gallon of acetone is added for each pound of filter cake obtained. The suspension is vigorously stirred for about 30 minutes then filtered by centrifugation. The resulting filtrate is evaporated to a small volume and the complex is precipitated in acid form by the addition of Skellysolve B (essentially n-hexane, B.P. 60-68°).

We claim:
1. A process for separating a coumermycin complex from the cells of a coumermycin fermentation broth which comprises
   (a) treating said cells with an aqueous solvent system containing a water miscible organic solvent and from about 25 to about 75 parts by volume of water per hundred parts of the solvent system and having a pH of from about 6 to about 9.0
   (b) filtering the so-obtained media; and
   (c) recovering the complex in the filtrate.

2. The process of claim 1 wherein the water miscible organic solvent utilized is selected from the group consisting of lower alkanols, simple ketones, water miscible ethers, glycols, dimethylformamide, dimethylsulfoxide, dimethylacetamide and mixtures thereof.

3. The process of claim 2 wherein the pH utilized is from about 7.3 to about 7.8.

4. A process as in claim 3 wherein the water miscible solvent is selected from the group consisting of methanol, ethanol, normal propanol, tertiary butyl alcohol, isopropanol, acetone, tetrahydrofuran, dioxane, ethyleneglycol dimethyl ether, propyleneglycol dimethyl ether, dimethylsulfoxide, dimethylformamide, dimethylacetamide, and mixtures thereof.

5. A process as in claim 1 wherein the complex is recovered from the filtrate by adjusting the pH of the filtrate to from about pH 2 to about pH 5 and separating the complex which precipitates as a result of the pH adjustment.

6. A process of separating a coumermycin complex from the cells of a coumermycin broth which comprises adjusting the pH of the fermentation broth to a pH of from about 2 to about 5, then filtering the so-obtained medium whereby to effect removal of the cells from the fermentation broth, adding said cells to an aqueous solvent system containing a water miscible solvent and from about 25 to about 75 parts by volume of water per hundred parts of the solvent system and having a pH of from about 6 to about 9.0, filtering the so-obtained medium whereby to remove the spent cell and recovering the complex from the filtrate.

7. The process of claim 6 wherein the water miscible organic solvent utilized is selected from the group consisting of lower alkanols, simple ketones, water miscible ethers, glycols, dimethylformamide, dimethylsulfoxide, dimethylacetamide and mixtures thereof.

8. The process of claim 7 wherein the pH of the aqueous solvent system is from about 7.3 to about 7.8.

9. A process as in claim 8 wherein the water miscible solvent is selected from the group consisting of methanol, ethanol, normal, propanol, tertiary butyl alcohol acetone, isopropanol, tetrahydrofuran, dioxane, ethyleneglycol dimethyl ether, propyleneglycol dimethyl ether, dimethylsulfoxide, dimethylformamide, dimethylacetamide and mixtures thereof.

10. A process as in claim 6 wherein the complex is recovered from the said filtrate by adjusting the pH of the filtrate to from about pH 2 to about pH 5 and separating the complex which precipitates as a result of the pH adjustment.

References Cited

UNITED STATES PATENTS 3,155,647  11/1964  Dutcher et al. _____ 260—210AB
3,201,386   8/1965  Kawaguchi et al. _____ 260—210

LEWIS GOTTS, Primary Examiner

J. R. BROWN, Assistant Examiner